T. W. VARLEY.
CONTROL OF ALTERNATING CURRENT MOTORS.
APPLICATION FILED JUNE 18, 1914.

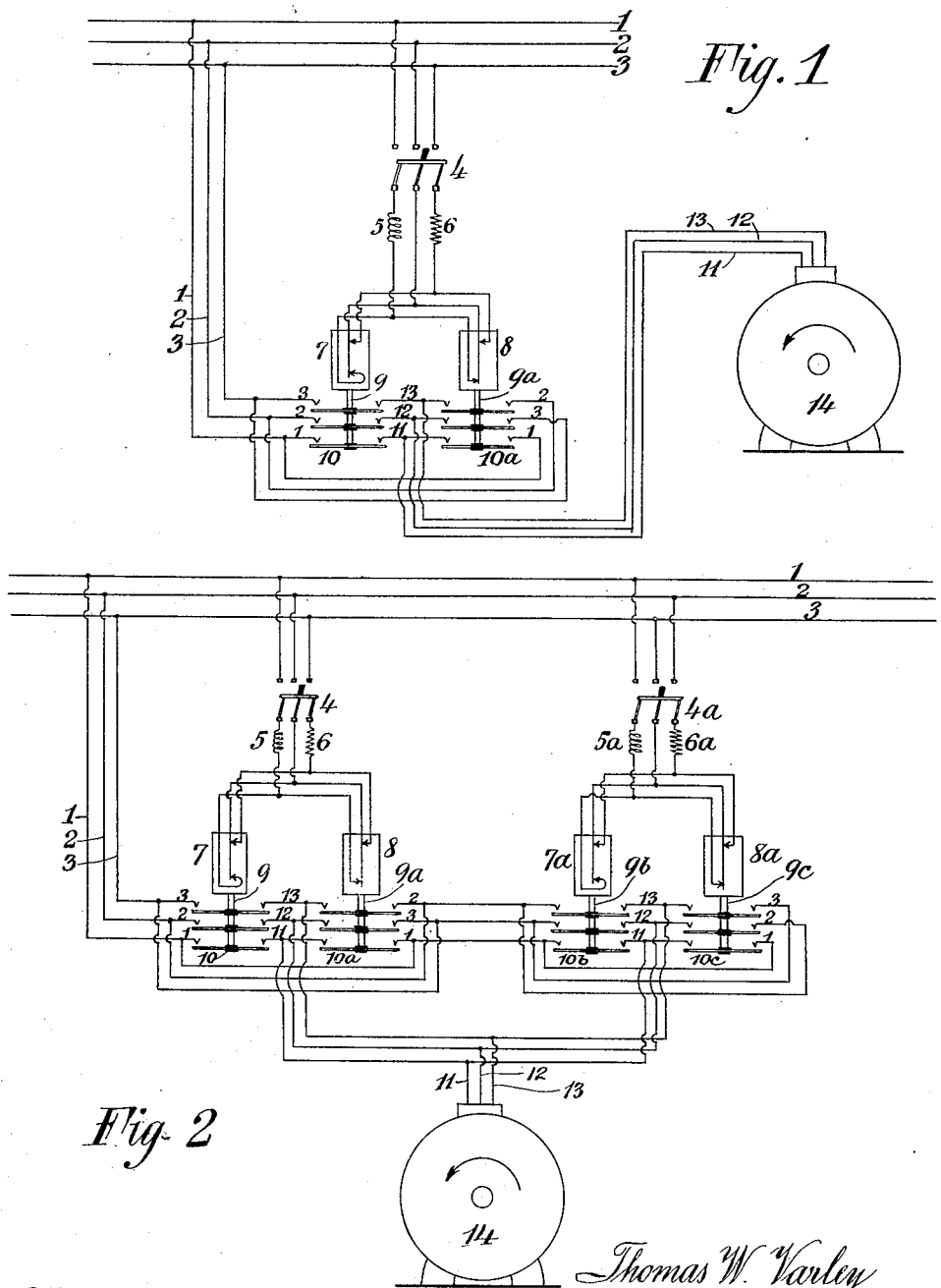

1,228,852.

Patented June 5, 1917.
2 SHEETS—SHEET 2.

Witnesses:
J. Konigsberg
H. G. Leard

Thomas W. Varley, Inventor
By his Attorneys
Masuck & Lucke

UNITED STATES PATENT OFFICE.

THOMAS W. VARLEY, OF NEW YORK, N. Y.

CONTROL OF ALTERNATING-CURRENT MOTORS.

1,228,852.      Specification of Letters Patent.      Patented June 5, 1917.

Application filed June 18, 1914. Serial No. 845,785.

*To all whom it may concern:*

Be it known that I, THOMAS W. VARLEY, a citizen of the United States of America, and resident of the borough of Manhattan, city, county, and State of New York, have invented certain new and useful Improvements in the Control of Alternating-Current Motors, of which the following is a specification.

My invention relates to improvements in control of alternating current motors. The object of the invention is to insure that the rotation of the motor will be always in the desired direction after it is once installed, independent of the reversal of the phases by accident or otherwise. This object is of great importance in the operation of all alternating current motors as is obvious. As an instance of its utility I cite its use in connection with the operation of elevators, for example.

The invention comprises broadly the taking advantage of the shifting of the current in one winding of a receiving device toward or from the current in the other winding of the receiving device (in phase notation), due to whether the phase rotation is positive or negative. To assist in this action the circuit of the windings of the receiving device may be suitably adjusted as will hereinafter appear.

In the following I have described, in connection with the accompanying drawings, several applications of my invention.

Figure 3:
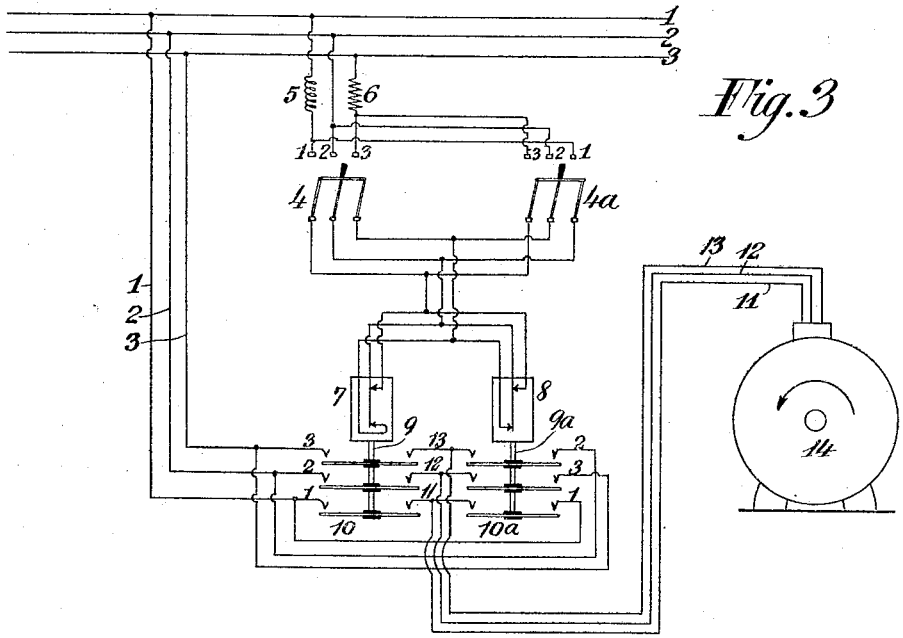
Figure 4:
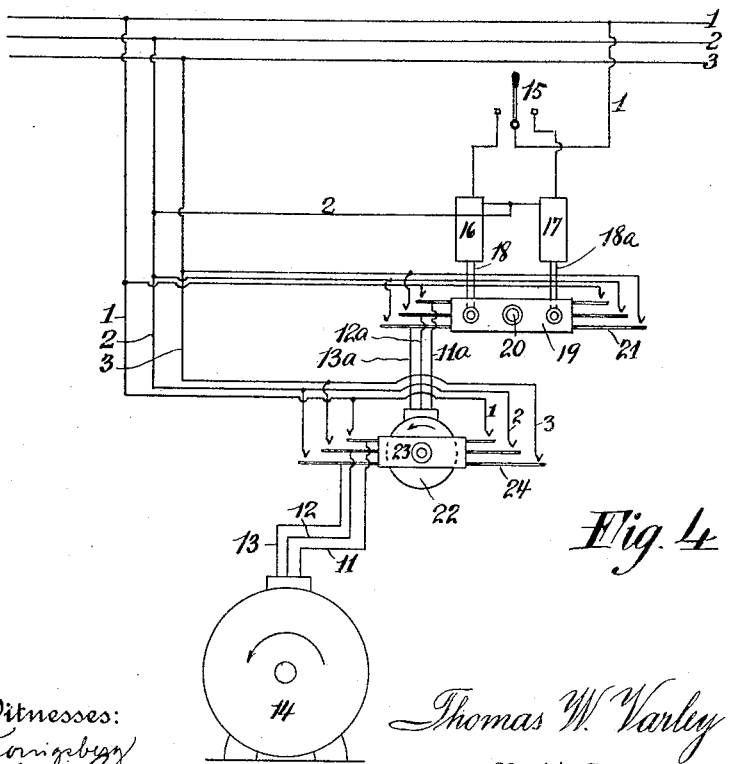

In the drawings, all of which are diagrammatic, Figure 1 shows an ordinary switch and two solenoids adapted to give positive rotation of the motor only; Fig. 2 is similar to Fig. 1 but shows an arrangement adapted to give both positive and negative rotation; Fig. 3 is similar to Fig. 2 showing an arrangement using half the number of solenoids as in Fig. 2 but also adapted to give both positive and negative rotation; Fig. 4 shows an arrangement for giving positive and negative rotation with a selective device in the form of an auxiliary alternating current motor.

Similar numerals of reference indicate similar parts throughout the several views.

Referring particularly to the first three figures of the drawings, 1, 2 and 3 indicate the line wires from a suitable source of alternating current supply (not shown). 4, 4$^a$ indicate three-pole switches. 5, 5$^a$ indicate reactances in line wire 1, and 6, 6$^a$ indicate resistances in line wire 3, line wire 2 assumed to be common. 7, 7$^a$ indicate solenoid magnets with the windings in the same direction as shown by the arrows. 8, 8$^a$ indicate solenoid magnets with the windings in opposite direction as shown by the arrows.

9, 9$^a$, 9$^b$ and 9$^c$ indicate the plungers of the respective solenoid magnets carrying respectively and insulated therefrom a series of contact plates 10, 10$^a$, 10$^b$ and 10$^c$. 11, 12 and 13 indicate wires adapted to connect the respective contact plates to the motor 14.

Referring to Fig. 4 of the drawings parts corresponding to the parts in the first three figures of the drawings are indicated by corresponding numerals. 15 indicates a single pole, double throw, switch for controlling the current alternately to solenoids 16 and 17, the current being taken, for instance, from line wires 1 and 2. 18, 18$^a$ indicate the plungers of the respective solenoids 16 and 17, mechanically connected to rocking arm 19. Rocking arm 19 is carried by supporting pin 20 and in turn carries contact plates 21. 22 indicates an auxiliary alternating current motor adapted to turn in one direction or the other depending upon the phase rotation. 23 indicates a rocking arm carried by the armature of motor 22, and in turn carries contact plates 24.

Referring to Fig. 1 on closing switch 4, three-phase current is applied to solenoids 7 and 8. The action of these solenoids in conjunction with the reactance 5 and resistance 6 is such that one solenoid, say 7, will lift its plunger and the other solenoid, say 8 will not, the windings on solenoids 7 and 8 being in opposite directions as shown. As solenoid 7 lifts its plunger 9 it closes a three-phase circuit to motor 14 through wires 11, 12 and 13. This will give rotation to the motor in the direction shown by the arrow, for instance. If the phase rotation of the line wires 1, 2 and 3 is reversed at its source then upon closing switch 4, solenoid 8 will lift its plunger instead of solenoid 7 lifting its plunger and the motor will now have its three-phase energy with its line wires crossed as shown and, in consequence of the crossing of one phase to the motor, and also in consequence of the reverse rotation of the phases from the original source, the motor 14 will continue to rotate in the direction of the arrow, thus making the motor always rotate in the same direction independent of changes of phase rotation.

Referring to Fig. 2 it will be noted that the operation of the parts shown in the left-hand half of the drawing is exactly similar in all respects to that last above described in connection with Fig. 1. The operation of the parts shown in the right-hand half of Fig. 2 is similar to the operation of the parts shown in the left-hand half thereof, except that the solenoids 7ª and 8ª on closing the circuit to motor 14, reverse one phase relative to the solenoids 7 and 8 respectively as clearly appears in the drawing; that is, upon closing switch 4ª, motor 14 will rotate in the direction opposite to the arrow so as to provide for driving the motor in either direction.

Referring to Fig. 3, the object of this arrangement is to allow for reversal of the motor 14 while using a less number of solenoids than in the arrangement shown in Fig. 2, this being accomplished by having the reactance 5 and the resistance 6 placed ahead of the switches 4 and 4ª so that upon closing switch 4 or switch 4ª the reactance and the resistance change places relative to the windings of the solenoids 7 and 8, as, for instance, if switch 4 is closed, with normal phase rotation of the source of supply, solenoid 7 will act only. If however switch 4ª is closed instead of switch 4 then solenoid 8 will act instead of solenoid 7. If the rotation of the source of supply is abnormal or reversed, the action of the solenoids 7 and 8 is changed, that is, if switch 4 is closed, under such conditions, solenoid 8 acts and not solenoid 7. Similarly if switch 4ª is closed, under the conditions last assumed, solenoid 7 acts and not solenoid 8. It is thus seen that switch 4 will always give positive rotation, in the direction of the arrow, to the motor 14, while switch 4ª will always give a reverse rotation, against the arrow, to the motor 14, each action taking place independent of the phase rotation of the source of supply.

Referring to Fig. 4, the operation, in this case, is initiated from a point distant relative to the motor by means of switch 15 controlling the action of two solenoids 16 and 17 respectively, which solenoids act upon a combination switch taking the place of two single switches. This combination switch, comprising the solenoids 16 and 17, plungers 18 and 18ª rocker arm 19 and contact plates 21, acts to close the circuit leading from the source of supply to the auxiliary motor 22. This auxiliary motor 22 in turn acts to close the circuit from the source of supply to motor 14. Throwing switch 15 to the left energizes solenoid 16 which closes the contacts to the left of rocker arm 19. With normal phase rotation of the source of supply auxiliary motor 22 will then close the contacts to the right of rocker arm 23 and motor 14 will rotate in the direction of the arrow. Upon throwing source 15 to the right solenoid 17 will act lifting rocker arm 19 to close the contacts to its right side. This action reverses one phase to auxiliary motor 22 causing it to rotate against the arrow, closing the contacts to the left of rocker arm 23, which action also reverses one phase to the motor 14 causing it to rotate against the arrow. Thus the direction of rotation of the motor 14 is controlled by the switch 15. If now the phase rotation of the source is reversed the action of auxiliary motor 22 will be reversed relative to the direction above described when switch 15 was assumed to be thrown to the left, and the phase rotation to motor 14 will be reversed to what it was when switch 15 was assumed to be thrown to the left, giving a double reversal of phase rotation from the source to motor 14, in consequence of which motor 14 will rotate in the direction shown by the arrow; that is, if switch 15 is thrown to the left, motor 14 will always rotate in the direction of the arrow and if switch 15 is thrown to the right motor 14 will always rotate against the arrow. Auxiliary motor 22 acts as a selective device to direct the phase reversals from the source in the well known manner.

What I claim is:

1. A method of control of alternating current motors consisting in utilizing an even number of solenoid magnets each one-half being arranged to respond differently to the phase rotations of the source, to control the closure of the circuit and the rotation of the motor.

2. A method of control of alternating current motors consisting in utilizing an even number of solenoid magnets each one-half being arranged to respond differently to the phase rotations of the source but only one-half being actuated at any one time, to control the closure of the circuit and the rotation of the motor.

3. A method of control of alternating current motors consisting in utilizing an even number of solenoid magnets each one-half being arranged to respond differently to the phase rotation of the source, to control the closure of the circuit and the rotation of the motor, said magnets being automatically selective to maintain the right phase rotation in the motor.

4. A method of control of alternating current motors consisting in utilizing an even number of solenoid magnets each one-half being arranged to respond differently to the phase rotations of the source, to control the closure of the circuit and the rotation of the motor, and means for reversing the motor.

5. A method of control of alternating current motors consisting in utilizing an even number of solenoid magnets each one-half being arranged to respond differently to the phase rotations of the source, to control the closure of the circuit and the rotation of the motor, and means for reversing the action of the solenoids.

In testimony whereof I have signed this specification in the presence of two subscribing witnesses.

THOMAS W. VARLEY.

Witnesses:
K. G. LE ARD,
S. M. BAEDER.

Copies of this patent may be obtained for five cents each, by addressing the "Commissioner of Patents, Washington, D. C."